(12) United States Patent
Wu et al.

(10) Patent No.: US 6,243,624 B1
(45) Date of Patent: Jun. 5, 2001

(54) NON-LINEAR MUSCLE-LIKE COMPLIANT CONTROLLER

(75) Inventors: Chi-haur Wu, Skokie; Der-Tsai Lee, Wilmette, both of IL (US)

(73) Assignee: Northwestern University, Evanston, IL (US)

( * ) Notice: Subject to any disclaimer, the term of this patent is extended or adjusted under 35 U.S.C. 154(b) by 0 days.

(21) Appl. No.: 09/272,144

(22) Filed: Mar. 19, 1999

(51) Int. Cl.$^7$ .............................. G05B 15/00; G05B 19/00
(52) U.S. Cl. .................. 700/260; 700/245; 700/251; 700/260; 700/261; 700/248; 700/259; 700/45; 700/263; 901/9; 901/15; 901/18; 901/45; 600/341; 600/407; 600/410; 600/526; 600/587; 318/568.1; 318/568.11; 318/568.18; 318/561
(58) Field of Search .................................. 700/245, 251, 700/262, 260, 261, 259, 248, 263, 45; 318/568.1, 568.18, 561; 901/9, 18, 45, 15, 34; 600/509, 526, 341, 479, 407, 410, 587

(56) References Cited

U.S. PATENT DOCUMENTS

| | | | |
|---|---|---|---|
| 5,023,808 | 6/1991 | Seraji | 700/248 |
| 5,206,930 | 4/1993 | Ishikawa et al. | 700/260 |
| 5,276,390 | 1/1994 | Fisher et al. | 318/568.1 |
| 5,414,799 | 5/1995 | Seraji | 700/260 |
| 5,466,213 | * 11/1995 | Hogan et al. | 601/33 |
| 5,469,531 | 11/1995 | Faure et al. | 700/251 |
| 5,794,621 | * 8/1998 | Hogan et al. | 600/407 |
| 5,913,827 | * 7/1999 | Gorman | 600/407 |
| 5,942,954 | * 8/1999 | Galiana et al. | 351/209 |
| 6,066,075 | * 5/2000 | Poulton | 428/8 |
| 6,088,017 | * 7/2000 | Tremblay et al. | 345/156 |

OTHER PUBLICATIONS

Huang et al., A Computer–Controlled Electromechanical Hammer To Quantify Tendon Reflex, IEEE., pp. 2242–22451997, 1991.*
He et al., Feedback Gains For Correcting Small Perturbations To Standing Posture, IEEE., pp. 322–332, 1991.*
Leob, Control Implications Of Musculoskeletal Mechanics, IEEE., pp. 1393–1394, 1997.*
He et al., Feedback Gains For Correcting Small Pertubations To Standing Posture, IEEE., pp. 518–526, 1989.*

* cited by examiner

Primary Examiner—William A. Cuchlinski, Jr.
Assistant Examiner—McDieunel Marc
(74) Attorney, Agent, or Firm—McAndrews, Held & Malloy, Ltd.

(57) ABSTRACT

A compliant controller implements a biological model of a primate muscle so as to provide simultaneous position and force control with nonlinear damping for an actuator. The compliant controller uses one or more position sensors but does not require the use of a force sensor to provide force control. The compliant controller implements a force determining algorithm that is a function of an initial actuator position, a subsequently sensed actuator position, a desired actuator position and a position calculated from a nonlinear damping function. The algorithm updates or resets the initial actuator position or the calculated position depending upon the amount of actuator movement sensed. The compliant controller in accordance with the force determining algorithm and resetting of the various position values allows a desired position to be quickly attained while allowing the controller to compliantly respond to the presence or removal of an unknown or unexpected disturbing force.

20 Claims, 5 Drawing Sheets

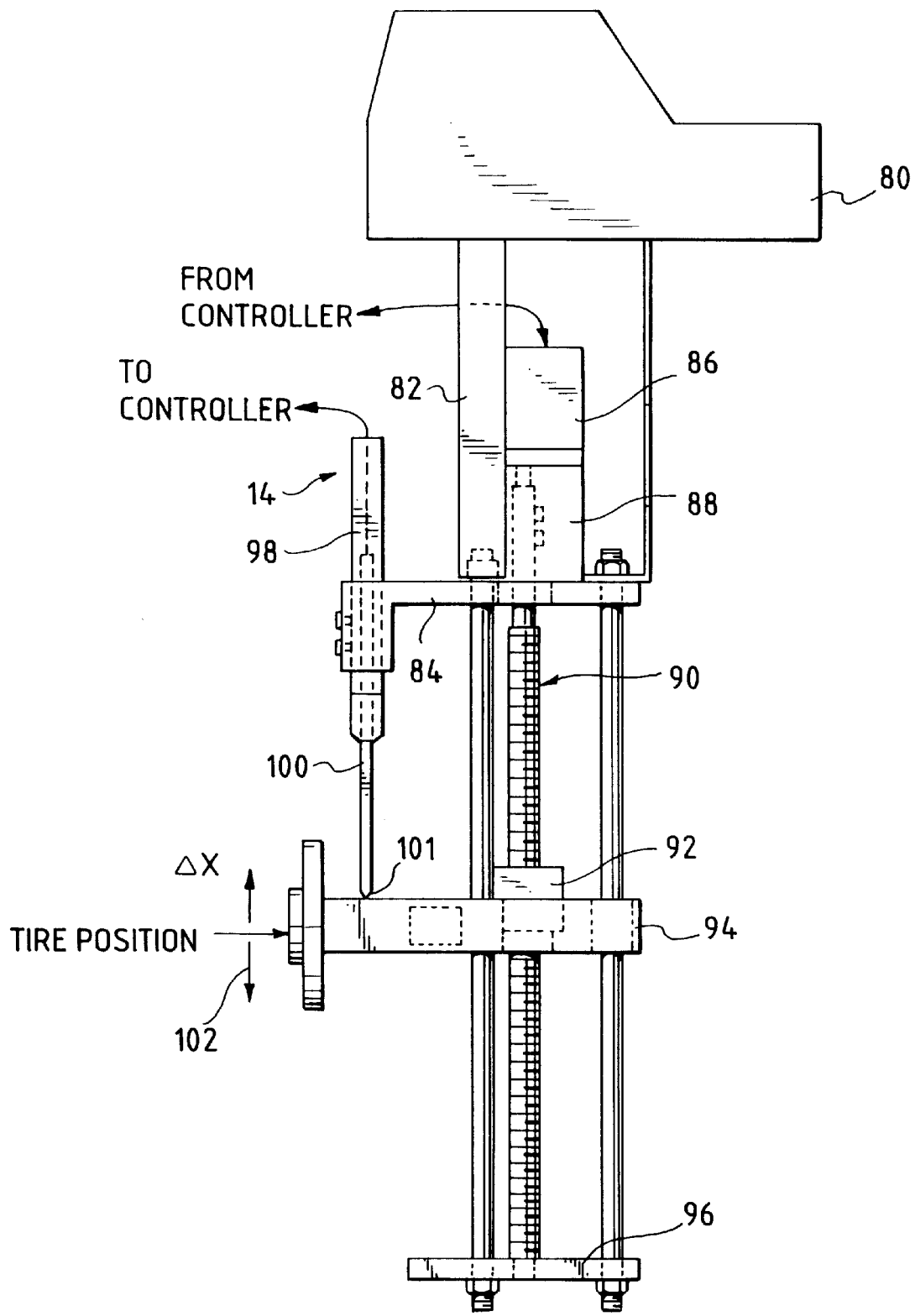

NON-LINEAR MUSCLE-LIKE COMPLIANT CONTROLLER

TECHNICAL FIELD

The present invention is directed to a compliant controller and more particularly to a compliant controller that provides simultaneous control of position and force in the same direction and without the use of a force sensor.

BACKGROUND OF THE INVENTION

In order to control multiple joints of an industrial robot, an upper level planning controller provides commands to one or more PID controllers. A PID controller is provided for each joint of the robot and is coupled to an actuator, such as a motor or the like, that controls movement of the joint. The PID controller may not be programmed as a compliant controller that provides both position control and force control in response to commands from the planning controller.

Known compliant controllers provide position control and force control for a joint or actuator by switching between a position control algorithm and a force control algorithm as needed. Heretofore, such complaint controllers have not been able to simultaneously provide position and force control in the same direction. Typically, with these known controllers, if a joint is to move in the X direction and apply a force in the X direction, the position control algorithm would be used to move the joint to a desired or commanded position, at which point the movement of the joint would be stopped after a controlled deceleration and the controller would switch to the force control algorithm. In order to control force, known compliant controllers require force sensors to monitor the forces encountered by the actuator so that the force control can provide the appropriate response. During position control, if an unexpected, i.e. disturbing force is encountered, known position controllers respond by increasing the output torque of the actuator in an attempt to overcome the disturbing force and reach the desired position. This can result in damage to the actuator. In attempting to overcome this problem, complex software programs have been developed to control the switching between the position and force controls and to account for the decelerations, etc., associated with stopping movement in order to switch. Because these controllers are so complex and are not sufficiently adaptable to a wide range of disturbing forces, they have not been widely adopted in industry.

As an alternative to known types of compliant controllers discussed above, research has been conducted to control robot joints based on a biological model such as a primate muscle. This research has also extended into using the biological model of a primate muscle for active suspension control. This research is described in the following articles. Wu, C. H., J. C. Houk, K. Y. Young, and L. E. Miller, "Nonlinear Damping of Limb Motion" book chapter, Multiple Muscle Systems: Biomechanics and Movement Organization edited by J. M. Winters and S. L-Y. Woo, Springer-Verlag New York Publishers, 1990, pp. 214–235. Wu, C. H., K. Y. Young, and J. C. Houk, "A neuromuscular-Like Model for Robotic Compliance Control," *Proceedings of 1990 IEEE Int. Conference on Robotics and Automation*, Cincinnati, Ohio, May 1990, pp. 1885–1890. Wu, C. H., K. Y. Young, and K. S. Hwang, "Analysis of Voluntary Movements for Robotic Control," IEEE 1991 *International Conference on Robotics and Automation*, Sacramento, Calif., Apr. 1991. Wu, C. H., K. Y. Young, K. S. Hwang, and S. Lehman, "Voluntary Movements for Robotic Control," IEEE *Control Systems Magazine*, Vol. 2, No. 1, February 1992, pp. 8–14. Wu, C. H. and K. S. Hwang, "Nonlinear Neuromuscular Control for Robotic Compliance Control," *Proceedings of the* 1993 *IEEE International Symposium on Intelligent Control*, August 1993, 238–243. Wu, C. H. and S. L. Chang, "Implementation of a Neuromuscular-like Control for Compliance on A PUMA 560 Robot," *Proceedings of the* 34$^{th}$ *IEEE International Conference on Decision and Control*, New Orleans, La., Dec. 1995, 1597–1602. Wu, C. H., S. L. Chang, and D. T. Lee, "A Study of Neuromuscular-like Control for Rehabilitation Robots," *Proceedings of the* 1996 *IEEE International Conference on Robotics and Automation*, Minneapolis, Minn., April 1996. Chang, S.L. and C.H. Wu, "Design of an Active Suspension System Based on a Biological Model," *Proceedings of* 1997 *American Control Conference*, Albuquerque, N. Mex., June 1997. Wu, C. H., K. S. Hwang, and S. L. Chang, "Analysis and Implementation of a Neuromuscular-like Control for Robotic Compliance," *IEEE Transactions on Control Systems Technology*, Vol. 5, No. 6, November 1997, pp. 586–597. However, the implementation of the biological model to form a compliant controller suitable for commercialization has been a complex task.

BRIEF SUMMARY OF THE INVENTION

In accordance with the present invention, the disadvantages of prior compliant controllers have been overcome. The present invention implements a biological model of a primate muscle for a compliant controller so as to provide simultaneous position and force control with nonlinear damping for an actuator. The implementation of the present invention allows the compliant controller to easily adapt its output to an unknown and/or unexpected force, i.e., a disturbing force, that is encountered without requiring the use of a force sensor. The compliant controller of the present invention can adapt to a wide range of disturbing forces varying up to 1000 fold without the need to change the controller's internal gain settings.

More particularly, the compliant controller of the present invention does not require the use of force sensors, but instead uses at least one position sensor. The position sensor detects or senses the output position of the actuator. The actuator may be an electric actuator such as a motor, a hydraulic actuator or a pneumatic actuator, etc., the output force or torque of which is being controlled by the compliant controller. The output of the position sensor is coupled to a processor that operates in accordance with a force determining algorithm to determine an output actuating force for the actuator. The force determining algorithm is a function of an initial actuator position, a subsequently sensed actuator position, a commanded, i.e. desired, actuator position and a position calculated from a nonlinear damping function. The processor compares the difference between an initial actuator position and a subsequently sensed actuator position to a value representing a predetermined amount of actuator movement. If the difference between the initial and subsequently sensed actuator positions is less than the predetermined amount of movement, the processor resets the calculated position to a predetermined value to immediately reduce the actuating force in the presence of a disturbing force. If the difference between the initial and subsequently sensed actuator positions is greater than the predetermined amount of movement, the processor sets the initial actuator position to the value of the subsequently sensed actuator position so that the compliant controller can quickly and precisely enable an actuator to attain a commanded position in the absence or removal of the disturbing force.

Unlike prior controllers, there is no need to program deceleration profiles in order to stop the movement of the actuator to switch between position and force controls because the compliant controller 10 of the present invention simultaneously controls position and force. The force determining algorithm in combination with the setting of the calculated position and the setting of the initial position depending upon the amount of sensed actuator output movement, allows the actuator controlled by the compliant controller to quickly attain and stop at a desired position. It allows the controller to automatically respond to a disturbing force encountered by the actuator output by absorbing the force and quickly reducing the controlled actuator output force. The force determining algorithm maintains at least a small amount of actuator output force in the presence of a disturbing force so that when the disturbing force is removed, the actuator position will change. This change in the actuator position and the resetting of the initial actuator position allows the compliant controller to respond to the removal of the disturbing force by quickly and automatically moving the actuator to the desired position.

Moreover, the same software routines used to operate the controller in a compliant mode as described above can be used to generate an output force in a force following mode that is used to teach the controller to move the actuator along a desired trajectory or path. In the force following mode, the user manually moves the actuator. The movement of the actuator by the user is aided by the controller which generates an output force that follows the actuator's movement. The generated output force makes it easier for the user to move the actuator. This is opposed to prior systems which require input command signals to move the actuator and wherein the actuator opposes any attempts of a user to manually move its output. In the force following mode of the present invention, as the actuator output is manually moved through a desired trajectory, the actuator position is sensed and stored so as to "teach" the actuator the trajectory. The stored position values are later used as position commands by the controller 10 to automatically move the actuator through the trajectory.

The compliant controller of the present invention can be used in a wide range of applications in which position and/or force are to be controlled. The applications include not only controls for industrial robots but also controls for surgical robots. Heretofore, prior compliant controllers were not suitable for a surgical robot because they were not sufficiently adaptable to unknown forces as occur in a noncontrollable environment such as surgery. The controller of the present invention provides the precision of a computer while simulating the compliancy of a human muscle so as to make feasible a surgical robot. Further, because the compliant controller simulates a muscle, it is particularly suitable for controlling an orthodic device so as to aid a handicapped person to have limb movement. Due to the use of the nonlinear damping function in the force determining algorithm, the compliant controller of the present invention can also provide an adaptive suspension control. These are just a few of the applications for the compliant controller of the present invention.

These and other advantages and novel features of the present invention, as well as details of an illustrated embodiment thereof, will be more fully understood from the following description and drawings.

BRIEF DESCRIPTION OF THE SEVERAL VIEWS OF THE DRAWING

FIG. 11 is an illustration of the use of the compliant controller of the present invention as an active suspension control.

DETAILED DESCRIPTION OF THE INVENTION

Figure 1:
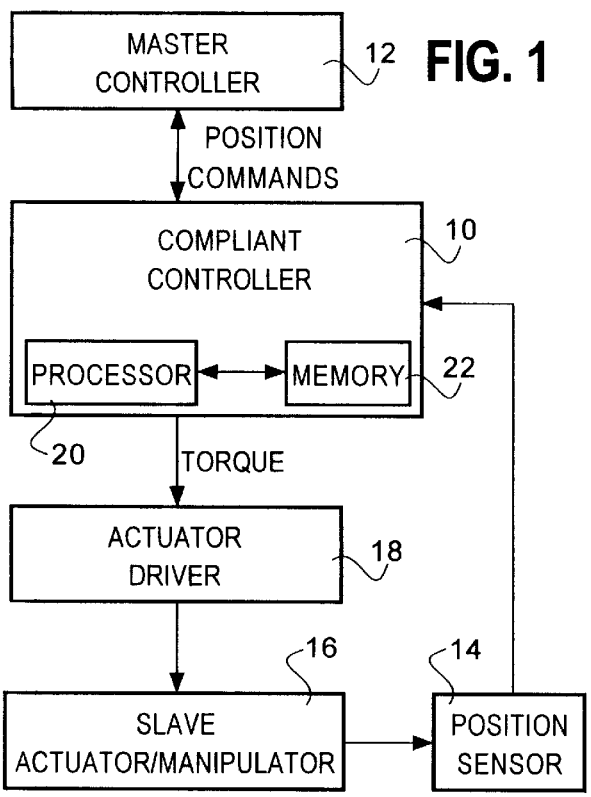
FIG. 1 is a block diagram illustrating the use of a compliant controller in accordance with the present invention to adaptively control the position and force of an actuator.

A compliant controller 10 in accordance with the present invention is responsive to the receipt of position commands from a master controller 12 and to the position of an actuator output as sensed by a position sensor 14 for controlling an actuator 16. The actuator 16 may be an electric motor, a hydraulic or pneumatic actuator, or a smart actuator (such as a piezoelectric or magnetostrictive actuator or one that uses a shape memory alloy), the output of which moves to accomplish a manipulation task. The output of the compliant controller is a force or torque command that is coupled to the actuator 16 via an actuator driver 18. The actuator driver 18 converts the output of the compliant controller 10 to an input signal of appropriate magnitude for driving the actuator 16. The actuator driver 18 may include a digital to analog converter and/or amplifiers and will vary depending upon the particular type of actuator 16 employed.

The master controller 12 may be a host processor or computer such as a planning controller for generating position command signals in accordance with a stored application program that generates high level commands. Alternatively, the position controller 12 may be a simple position command device such as a joy stick, mouse or the like that is actuatable by a user to generate position command input signals for the compliant controller 10. The master controller 12 may also include a position sensor that senses movement, such as finger or hand movement or movement of a device, the master controller 12 generating position command signals representing a desired output position of the actuator in response to the sensed movement.

The compliant controller 10 of the present invention includes a processor 20 that operates in accordance with a force determining algorithm stored in a memory 22. The force determining algorithm is a function of an initial actuator position $x^{init}$, a subsequently sensed actuator position, $x^{actuator}$ as derived from the position sensor 14, the next desired actuator position, $x^{next}$, and a calculated position value, $x^p$, that is calculated from a nonlinear damping function. The processor compares the difference between the initial actuator position $X^{init}$ and a subsequently sensed actuator position $x^{actuator}$ to a value δ representing a predetermined amount of actuator movement. If the difference between the initial and subsequently sensed actuator positions is less than the predetermined amount of movement, the processor 20 resets the calculated position to a predetermined value to immediately reduce the actuating force in the presence of a disturbing force. As used herein, a disturbing force is a force that is unexpected and/or of unknown magnitude that disturbs the movement of the actuator output as it moves to a commanded position. If the difference between the initial and subsequently sensed actuator positions is greater than the predetermined amount of movement, the processor sets the initial actuator position $x^{init}$ to the value of $x^{actuator}$ so that the compliant controller 10 can quickly and precisely enable the actuator to attain a commanded position in the absence or removal of the disturbing force. The force determining algorithm is such that as long as the desired position has not yet been attained, the algorithm will maintain at least a small amount of actuator force in the presence of a disturbing force so that when the disturbing force is removed, the actuator position will change. This change in the actuator position and the resetting of the initial actuator position $x^{init}$ to the value $x^{actuator}$ allows the compliant controller to quickly respond to the removal of the disturbing force by quickly and automatically moving the actuator to the commanded position.

The force determining algorithm implements a biological model of a primate muscle for the compliant controller 10 so as to provide simultaneous position and force control with nonlinear damping for the actuator 16. Thus, the compliant controller of the present invention simulates the operation of a primate muscle so as to be adaptable to different loads and capable of compliantly executing a task. That is, the compliant controller automatically adapts its output to the forces that the actuator encounters whether they are expected or unexpected.

Figure 2:
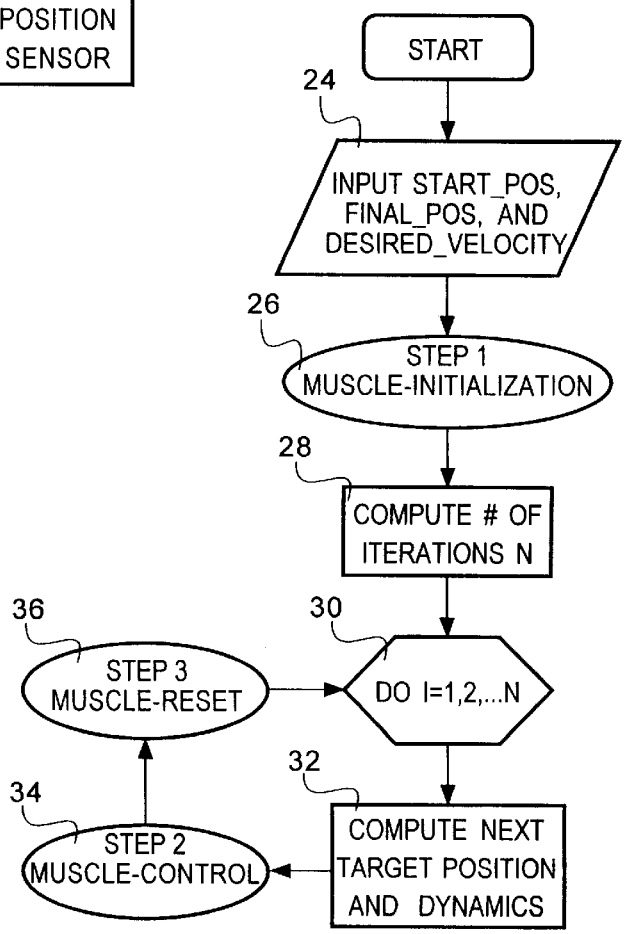
FIG. 2 is a flow chart illustrating a main software routine of the compliant controller implementation of the present invention.

The processor 20 implements the force determining algorithm in accordance with the flow charts depicted in FIGS. 2–5. As shown in FIG. 2, the processor 20 at a block 24 receives a starting position from the position sensor 14. It is noted that the master controller 12 may be coupled to the position sensor 14 and if so, the processor 20 may in the alternative, receive the starting position from the position sensor 14 via the master controller 12. The processor 20 also receives at block 24 a final position to be attained by the actuator and a desired velocity. The master controller 12 may also provide gain settings and/or a desired force for input to the compliant controller 10 depending upon the application for which the compliant controller is being used. At block 26, the processor 20 initializes various parameters of the force determining algorithm as discussed in detail below with respect to FIG. 3. The processor 20 at block 28 computes the number of iterations N that are to be used to move the actuator from the input starting position to the final position. At block 30, the processor 20 starts a loop in which N intermediate $x^{next}$ positions are calculated and for each intermediate position $x^{next}$, a determined output force or torque is determined. The processor 20 proceeds from block 30 to block 32 to compute the next target or desired position $x^{next}$ and a value $T_{in}$ based on the dynamics of the system. In order to compute $x^{next}$, the processor 20 preferably employs a fifth order polynomial to accomplish minimum jerk planning for the projected trajectory to reach the final position commanded by the master controller 12. FIG. 6 illustrates such a trajectory with a typical velocity profile. $T_{in}$ represents the dynamic force(s) operating on the actuator 16 and will vary depending on the application of the system. The dynamic force $T_{in}$ can represent a gravitational force, inertial force, coriolis force, centrifugal force, centripetal force, etc. or a combination of these forces.

Figure 4:
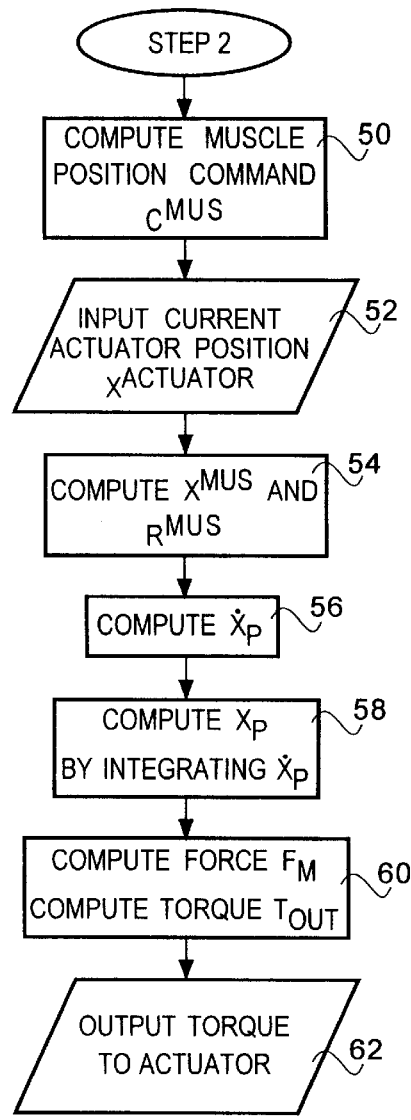
FIG. 4 is a flow chart illustrating the muscle control routine of FIG. 2.

From block 32, the processor 20 proceeds to block 34 to implement the muscle control routine depicted in FIG. 4. The muscle control routine receives as an input, the next intermediate target position $x^{next}$ and the dynamic force $T_{in}$. This routine generates an output torque $T_{out}$ to drive the actuator 16. It is noted, that the compliant controller can operate in one of two modes. In the compliant mode, the controller 10 is generating an output torque so as to drive the actuator to attain a commanded position and to respond to disturbing forces in a compliant manner. In a second or force-following mode, the controller 10 generates an output torque that allows the actuator to be manually moved to various positions. If the controller stores the positions that the actuator is moved to in the force following mode then a user can teach the compliant controller to move the actuator along a desired path or trajectory extremely easily as described in more detail below. The force following mode can also be used to move heavy objects by compensating for the dynamic forces that the actuator encounters. This mode can further be used by a physician to move a surgical actuator or the like into a desired position. Then the compliant mode can be used to control the actuator for surgical cutting or the like. From block 34, the processor 20 proceeds to block 36 to reset either the initial position value, $x^{init}$ or the calculated position value $x_p$ depending upon the sensed movement of the actuator. The processor 20 proceeds from block 36 to block 30 to calculate a next interim position and force, the loop of blocks 30, 32, 34 and 36 being repeated until the final position received at block 24 is attained.

Figure 3:
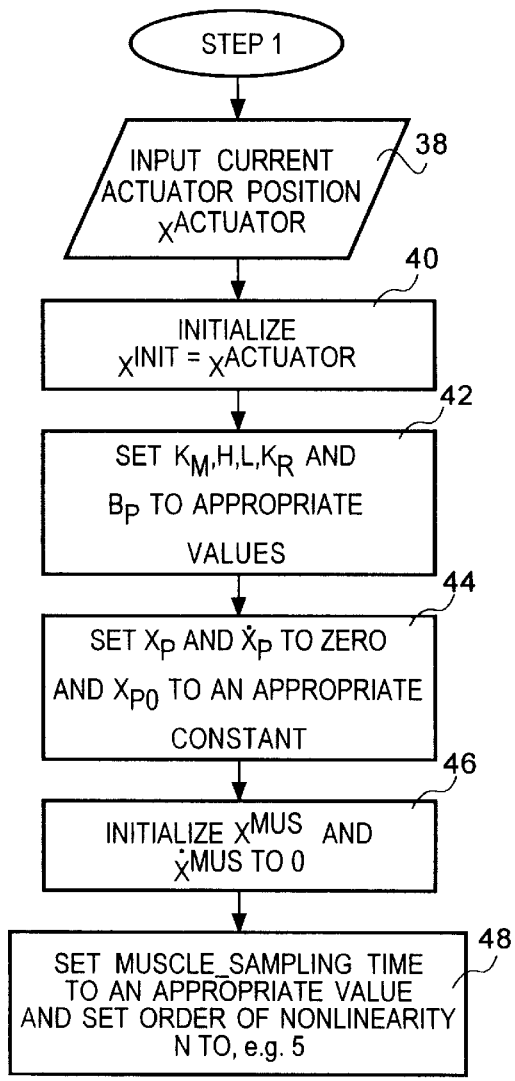
FIG. 3 is a flow chart illustrating the muscle initialization routine of FIG. 2.

As shown in FIG. 3, to initialize the compliant controller, the processor 20 at block 38 receives the current actuator position $x^{actuator}$ from the position sensor 14. The processor at block 40 initializes $x^{init}$ by setting it equal to $x^{actuator}$ as determined at block 38. At block 42, the processor 20 sets various constants to appropriate values depending upon the application of the compliant controller. These constants are used by the force determining algorithm to simulate a primate muscle and calculate the output force accordingly. The value $K_m$ is a constant that represents muscle stiffness. H is a reflex gain value. A linear feedback gain coefficient L represents the effect of muscle length-tension reflecting the variation of muscle length with load position. As will be apparent below, any change in muscle length will produce a muscle force $f_m$ through the muscle stiffness mechanism represented by the parameter $K_m$. The constant $K_r$ represents reflex stiffness and $B_p$ is a spindle damping coefficient. The values of these variables may vary from application to application.

Figure 9:
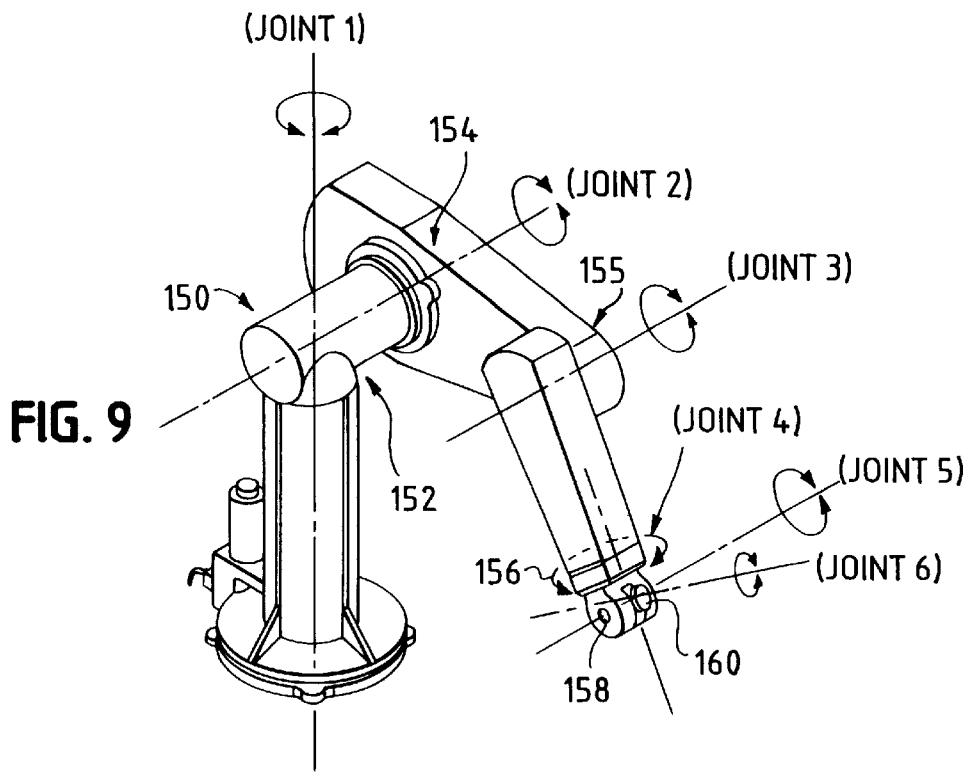
FIG. 9 is a perspective view of a robot arm having six degrees of freedom joint movement, the movement of each joint being driven by a respective actuator associated with the joint.
Figure 10:
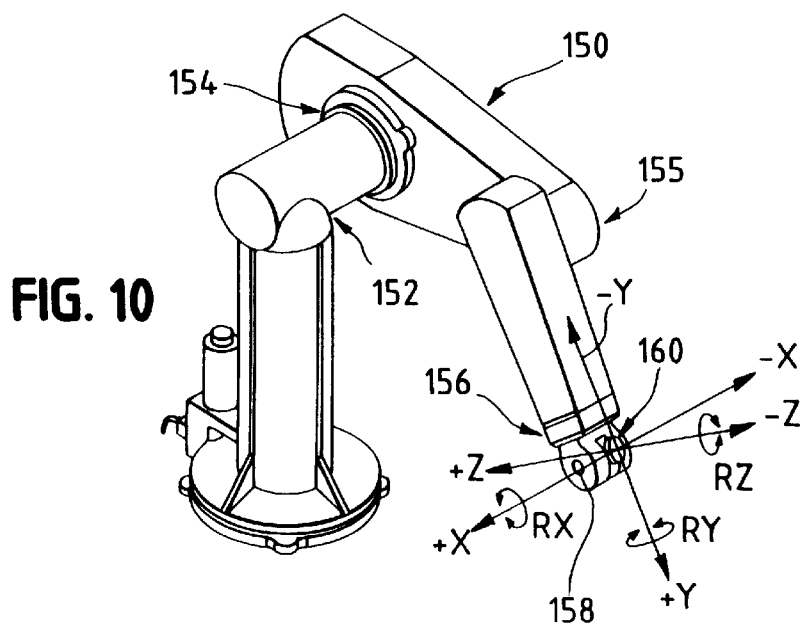
FIG. 10 is a perspective view of the robot arm of FIG. 9 illustrating six degrees of freedom for cartesian movement.

One application of the compliant controller 10 may be to control the movement of a robot as illustrated in FIGS. 9 and 10. The robot 150 has six joints, 152, 154, 155, 156, 158 and 160 each of which can be rotated about an axis as illustrated in FIG. 9 for each of the respective joints. By rotating about one or more of the axes of the joints 152, 154, 155, 156, 158 and 160, the joints can be moved relative to the cartesian coordinates depicted in FIG. 10 for the joint 160. That is, each joint can move with respect to the linear axes, the X axis, Y axis and Z axis and relative to the rotational axes RX, RY and RZ. In this embodiment, each of the joints is moved by an associated actuator that is controlled by a compliant controller 10. The compliant controller 10 receives inputs from the master controller 12 including the selection of one of the six joints and the axis X, Y, Z, RX, RY or RZ along or about which movement is desired.

In the embodiment of FIGS. 9 and 10, the muscle stiffness $K_m$ for the first joint 152 may be set equal to 209.37 * $\sqrt{1271.41/0.4556}$* 10. The value $K_m$ for the second joint 154 may be set equal to 209.37 * $\sqrt{1228.92/0.4556}$* 20. The value $K_m$ for the third joint 155 may be set equal to 209.37 * $\sqrt{185.82/0.4556}$* 15. The value $K_m$ for fourth joint 156 may be set equal to 209.37 * $\sqrt{15.24/0.4556}$* 2. The value $K_m$ for fifth joint 158 is set equal to 209.37 * $\sqrt{13.51/0.4556}$* 3. The value $K_m$ for sixth joint 160 is 209.37 * $\sqrt{15.31/0.4556}$* 4. The reflex gain value H for the first joint 152 may be set equal to 0.00166*90/10. The value of H for the second joint 154 may be set equal to 0.00166*265/20. The value of H for the third joint 155 may be set equal to 0.00166*160/15. The value of H for the fourth joint 156 may be set equal to 0.00166*52/2. The value of H for the fifth joint 158 may be set equal to 0.00166*50/3 and the value H for the sixth joint 160 may be set equal to 0.00166*50/4. The length tension constant L may be set equal to 1.0 for each of the six joints. The reflex stiffness constant $K_r$ may be set equal to 1042.32 for each of the six joints and the spindle damping coefficient $B_p$ may be set equal to 1203.212 for each of the six joints.

After the processor 42 sets the constants of the force determining algorithm to the appropriate values for the particular application of the compliant controller, the processor 20 proceeds to block 44. At block 44, the processor 20 sets the calculated position value $x_p$ and its derivative $\dot{x}_p$ to 0. The calculated position value $x_p$ represents the internal position of spindle receptors in a muscle and its derivative, $\dot{x}_p$ represents its velocity. At block 44, the processor 20 also sets a spindle bias position $x_{p0}$ to an appropriate constant such as −0.1. At block 46, the processor 20 initializes the muscle position $x_{mus}$ and its velocity $\dot{x}_{mus}$ to 0. Thereafter, at block 48, the processor 20 sets the sampling time of the compliant controller to an appropriate value. The processor 20 also sets the order of nonlinearity, n, to an odd integer for example, 5.

FIG. 4 illustrates the muscle control portion of the force determining algorithm. This same routine is used to generate an output force or torque $T_{out}$ in both the compliant mode and the force following or teaching mode. A value MODE is set equal to 1 if the controller 10 is to operate in the compliant mode and the value MODE is set equal to −1 if the controller 10 is to operate in the force following or teaching mode. The muscle control algorithm will be described with respect to FIG. 4 for the compliant mode first. In the compliant mode, the processor 20 at block 50 computes a muscle position command $C^{mus}$ which is set equal to $x^{init}-x^{next}$. Thereafter, at block 52, the position controller 20 reads the current actuator position $x^{actuator}$ from the position sensor 14. At block 52, the muscle position value $x^{mus}$ is calculated according to $x^{mus}=(x^{init}-x^{actuator})*$ MODE. At block 54, the processor 20 also calculates a reflex signal in accordance with the following equation: $r^{mus}=K_r * (x^{mus}-x_p)$. As can be seen, any change of the actuator position will induce a reflex signal $r^{mus}$. Next, the processor 20 proceeds to blocks 56 and 58 in order to calculate a position value $x_p$ that represents the position of the internal spindle of the simulated muscle. First, at block 56, the velocity v of the internal spindle is calculated as follows: $v=r^{mus}/(B_p*(|x_p|-\dot{x}_{p0}))$. Thereafter, at block 56, $x_p$ is calculated as follows: $\dot{x}_p=v^n$ where n, as discussed above is the order of nonlinearity and is set to an odd integer such as 5. After calculating, $v^n$, the processor 20 proceeds to block 58 to integrate $\dot{x}_p=v^n$ so as to derive a new internal spindle position value $x_p$. After calculating the value of $x_p$ at block 58, the processor proceeds to block 60. At block 60, the processor 20 first calculates a value $\lambda$ by applying a low pass filter for example 30 Hz to the value $H*r^{mus}-C^{mus}$ so that $\lambda=\text{LPF}(H*r^{mus}-C^{mus})$. Next, the processor 20 computes the simulated muscle force $f_m$ as follows: $f_m=K_m*(L*x^{mus}+\lambda)$. From the muscle force $f_m$ and the dynamic force $T_{in}$, the processor 20 determines the output force or torque command $T_{out}$ as follows: $T_{out}=T_{in}-f_m$. Thereafter, the processor 20 at block 62 outputs the determined force or torque, $T_{out}$ to the actuator 16 via the actuator driver 18.

Figure 7:
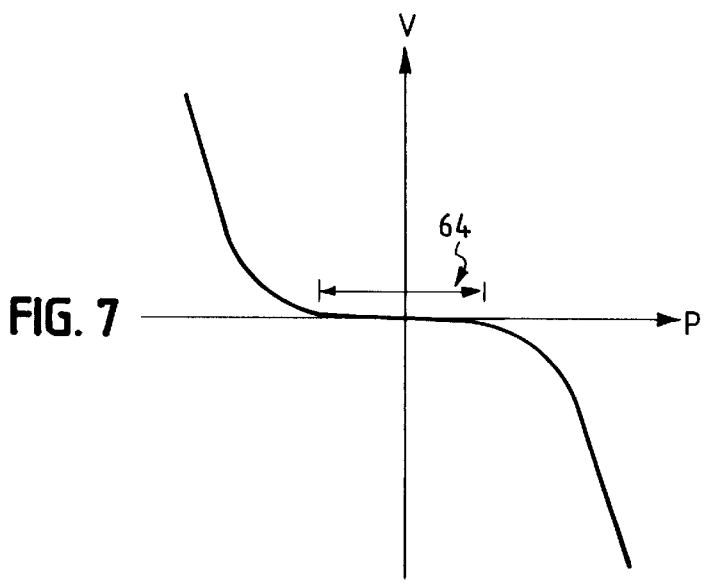
FIG. 7 is a graph of velocity versus position illustrating the dead band resulting from the nonlinear damping function of the present invention.
Figure 8:
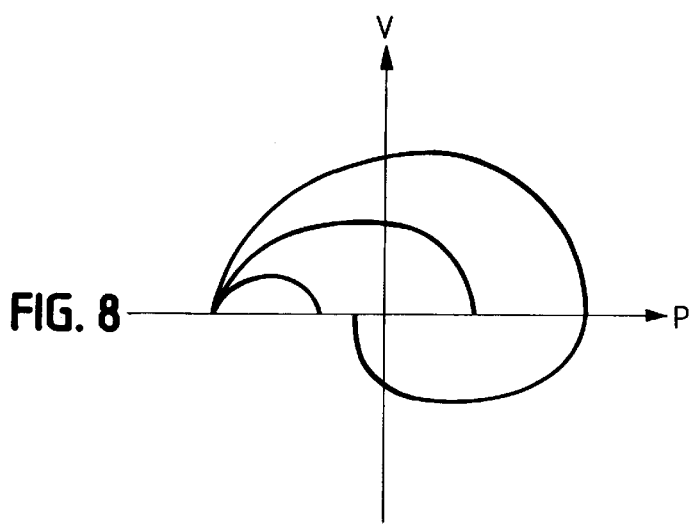
FIG. 8 is a phase plane plot between the position and velocity for movement of a load with respect to the dead band illustrated in FIG. 7.

In the above described equations, a nonlinear damping function is provided by $\dot{x}_p=v^n$ wherein, the order of non-linearity n represents a power of velocity dependent viscosity. FIG. 7 illustrates the dead band region 64 resulting from the nonlinear damping function. It is noted that, as the value n increases, the dead band region 64 becomes wider. The use of this nonlinear damping function results in a very stable system that eliminates oscillation as depicted in FIG. 8. Further, the function, $H*r^{mus}-C^{mus}$ used to compute $\lambda$ provides force control whereas the equation $f_m=K_m*(L*x^{mus}+\lambda)$ provides simultaneous position control for the compliant controller 10. By changing the relative values of H and $K_m$, the compliant controller may exert more position control or force control. For example, if H is small and $K_m$ is relatively large, then the compliant controller will exert more position control. Similarly, if H is large and $K_m$ is relative small, the compliant controller 10 exerts more force control.

Figure 5:
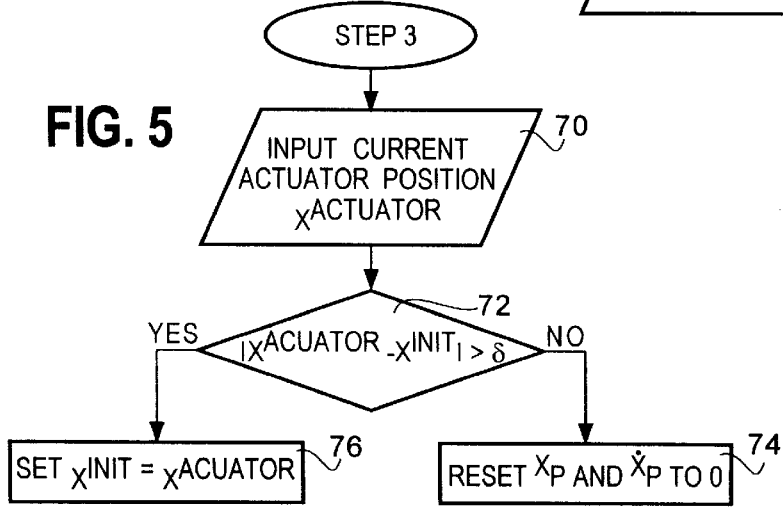
FIG. 5 is a flow chart illustrating the muscle reset routine of FIG. 2.
Figure 6:
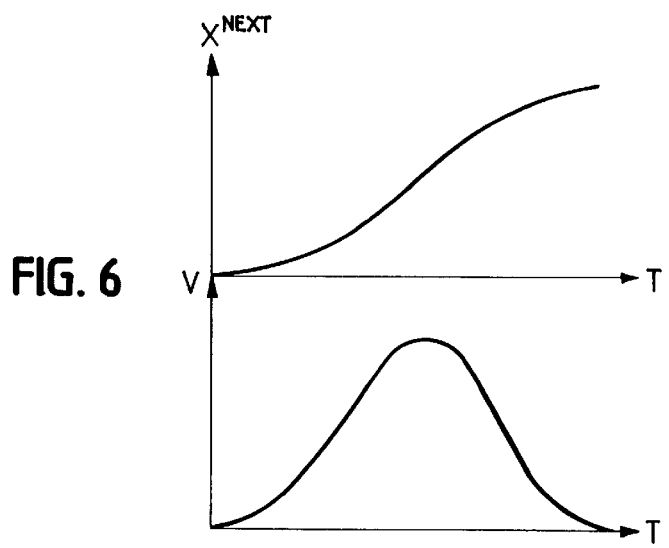
FIG. 6 is a graph illustrating a movement trajectory for computing the next desired position shown in FIG. 2 using a fifth order polynomial and a typical velocity profile.

After calculating the values $f_m$ and $T_{out}$, the processor 20 proceeds to the muscle reset routine depicted in FIG. 5. At block 70, the processor reads the current actuator position $x^{actuator}$ from the position sensor 14 and proceeds to block 72. At block 72, the processor determines whether the actuator has moved at least a predetermined amount, $\delta$ according to the following equation: $|x^{actuator}-x^{init}|>\delta$. If this small amount of movement $\delta$ is not detected, the processor 20 proceeds from block 72 to block 74. At block 74, the processor 20 resets $x_p$ and $\dot{x}_p$ to 0. This feature automatically reduces the output force in the presence of a disturbing force that inhibits movement of the actuator so that the controller 10 can adapt to the disturbing force. If the processor 20 determines at block 72 that the actuator has moved more than the predetermined amount $\delta$, then the processor proceeds from block 72 to block 76. At block 76, the processor 20 updates $x^{init}$ by setting $x^{init}$ equal to $x^{actuator}$.

The compliant controller 10 operating in accordance with the force determining algorithm described above with the position values reset in accordance with FIG. 5 allows the controller 10 to automatically correct the force $f_m$ so as to respond to external disturbing forces. The controller 10 has the capability of absorbing any impacting force that causes displacement of $x^{mus}$ in accordance with the nonlinear damping function so as to provide a system that is extremely stable. More specifically, the nonlinear damping function allows the controller to react to changes in position to actively damp out vibrations caused by an external force. When the disturbing force is so great as to prevent movement of the actuator, the resetting of the calculated position $x_p$ and its velocity to zero allows the compliant controller to quickly reduce the output force. As long as the position $x^{next}$ has not been reached, the force determining algorithm maintains at least a small output torque $T_{out}$ so that when the disturbing force is removed, the actuator will move. This detected movement of the actuator and the resetting of $x^{init}$ at block 76 causes the controller 10 to quickly enable the actuator to attain the desired target position, $x^{next}$.

In the force following mode, the compliant controller senses manual movement of the actuator and generates an output force that follows the user exerted force of the actuator so as to make the actuator easier to manually move. In this mode, the user can manually move the actuator along a desired path. As the actuator is manually moved, the compliant controller stores the sensed actuator position. The stored actuator positions can then be used as $x^{next}$ values in the compliant mode so that the controller 10 can automatically control the actuator to move along the stored path.

In the force following or teaching mode, the value of MODE as described above with reference to FIG. 4 is set to −1. The controller 10 utilizes the same software routines depicted in FIGS. 2–5 in the force following mode as in the compliant mode with only a few changes. In FIG. 4, in the force following or teaching mode, at block 50 the muscle position command $C^{mus}$ is set to 0. That is because there is no commanded position i.e. no $x^{next}$ value. Further, at block 54, the sign of $x^{mus}$ is reversed because MODE in the force following mode is set equal to −1. The sign of $x^{mus}$ is reversed in the force following mode so that the force generated by the compliant controller helps the user manually move the actuator output. Further, if the force following is used for teaching, the controller 10 at block 52 stores the current actuator position at block 52 so as to retain the trajectory of the actuator output as it is manually moved in the force following mode.

The compliant controller 10 in accordance with the present invention has numerous applications not limited to industrial robots as depicted in FIGS. 9 and 10. The compliant controller 10 of the present invention, for example, is imminently suitable for use as a controller for surgical devices in which computer controlled precision is desired but there is a need for compliancy because the external forces encountered during surgery are unknown and will vary from patient to patient. Moreover, because the compliant controller includes the nonlinear damping function it is suitable for use as an active suspension control.

FIG. 11 illustrates an active suspension control that seeks to maintain a body 80 at generally the same level and to absorb shock input to the system. In this example, the body 80 may be the body of a vehicle, for example. The shock absorbed by the system is caused by irregularity in a road surface. As will be apparent, the compliant controller 10 in this application serves as a controllable force absorber that can suppress the force or torque that occurs between components of the mechanical system and provides compliance for the mechanical components to reduce fatigue and structural damage.

More particularly, as shown in FIG. 11, the body 80, representing a body of a vehicle has a support 82 connected to a mounting bracket 84. The bracket 84 supports an actuator motor 86 via a motor mount 88. The actuator motor 86 drives a ball screw 90 in accordance with $T_{out}$ from the compliant controller 10 in order to maintain the level of the car body 80 constant. The body of the ball screw 90 extends through a ball nut 92 and a central mounting block 94 to a lower support 96. The central mounting block represents the position of one of the vehicle's tires. A position sensor 14 has a body 98 supported by the bracket 84. A stick portion 100 of the position sensor 14 is moveable within the body 98 and has an end 101 that rests on the central mounting block 94. As the position of the tire moves up and down with irregularities in the road, the stick 100 moves respectively up and down within the body 98 of the position sensor 14. The position sensor 14 is responsive to the movement of the stick portion 100 to generate $x^{actuator}$ signals that are coupled to the compliant controller 10 as described above. As the tire position moves downward in the direction of the arrow 102, the compliant controller 10 is responsive to this movement to determine a value of $x^{next}$ so as to maintain the body 80 level. In response to the sensed $x^{actuator}$ position and the determined $x^{next}$ value, the compliant controller 10 operates in accordance with the flow chart depicted in FIGS. 2–5 to generate a $T_{out}$ which drives the motor 86 to lengthen the ball screw 90 when the tire position moves down in the direction of the arrow 102 so as to maintain the level of the car body 80 relatively constant. For this active suspension control, the constants may be initialized as follows: $K_m$=69.3; H=0.1665; $B_p$=0.553, $K_r$=1.15 and $x_{p0}$=−0.8 mm.

The compliant nature of the controller 10 and the nonlinear damping function make the controller 10 suitable for controlling the position and output force of wide ranging devices, only a few examples of which, are noted above. The controller 10 in accordance with the force determining algorithm simulates a primate muscle in dealing with external forces that act to cause displacement or prevent movement of the actuator wherein disturbing forces are absorbed to provide a very stable system. The compliant controller uses only position sensors and not force sensors to detect external forces to simplify the software of the controller and to reduce the cost of the system so as to accomplish a commanded task in a compliant manner.

Many modifications and variations of the present invention are possible in light of the above teachings. Thus, it is to be understood that, within the scope of the appended claims, the invention may be practiced otherwise than as described hereinabove.

What is claimed and desired to be secured by Letters Patent is:

1. A compliant controller for an actuator that does not require the use of a force sensor comprising:
   a position sensor for sensing the position of the actuator to generate signals representing actuator position;
   a processor responsive to sensed actuator position and operating in accordance with a force determining algorithm that is a function of an initial actuator position, a subsequently sensed actuator position and a position calculated from a nonlinear damping function to determine an actuating force, the actuating force being nonzero in the presence of a disturbing force, the processor comparing the difference between an initial actuator position and a subsequently sensed actuator position to a value representing a predetermined amount of movement, the processor resetting the calculated position to a predetermined value if the difference is less than the predetermined amount of movement to reduce the actuating force in the presence of a disturbing force and the processor setting the initial actuator position to the subsequently sensed actuator position if the difference is greater than the predetermined amount of movement.

2. A compliant controller as recited in claim 1 wherein said force determining algorithm simulates a primate muscle.

3. A compliant controller as recited in claim 1 wherein said processor calculates a position by integrating $v^n$ where n is an odd number representing an order of nonlinearity; $v=r^{mus}/(B_p*(|x_p|-x_{po}))$; $r^{mus}=K_r*(X^{mus}-x_p)$; $x^{mus}$ is the difference between the initial actuator position and a subsequently sensed actuator position; $K_r$ is a stiffness constant; $B_p$ is a damping coefficient; $x_{po}$ is a nonzero constant and $x_p$ is the calculated position having an initialization value of zero.

4. A compliant controller as recited in claim 1 wherein said processor includes a teaching mode that uses the force determining algorithm to determine an actuating force that allows the actuator to be manually moved to follow a desired path, the processor storing as command actuator positions the actuator positions sensed as the actuator is manually moved so that in a control mode the processor can control the actuator to move along the path represented by the actuator positions stored in the teaching mode.

5. A compliant controller for an actuator that does not require the use of a force sensor comprising:

a position sensor for sensing the position of the actuator to generate signals representing actuator position;

a processor responsive to sensed actuator position and operating in accordance with a force determining algorithm to determine an actuating force where the algorithm is a function of an initial actuator position, a subsequently sensed actuator position, a desired actuator position and a position calculated from a nonlinear damping function, the processor comparing the difference between an initial actuator position and a subsequently sensed actuator position to a value representing a predetermined amount of movement and the processor resetting the calculated position to a predetermined value if the difference is less than the predetermined amount of movement to adapt the actuating force to a disturbing force.

6. A compliant controller as recited in claim 5 wherein the processor resets the calculated position to a predetermined value of zero if the difference is less than the predetermined amount of movement.

7. A compliant controller as recited in claim 5 wherein the processor adapts the actuating force to the disturbing force by reducing the actuating force to stop movement of the actuator in the presence of a disturbing force.

8. A compliant controller as recited in claim 5 wherein the processor sets the initial actuator position to the subsequently sensed actuator position if the difference is greater than the predetermined amount of movement to generate an actuating force to rapidly move the actuator in response to removal of the disturbing force.

9. A compliant controller as recited in claim 5 wherein said processor determines a nonzero actuating force in the presence of a disturbing force to cause the actuator to automatically move upon removal of the disturbing force.

10. A compliant controller as recited in claim 5 wherein said force determining algorithm simulates a primate muscle.

11. A compliant controller as recited in claim 5 wherein said processor calculates a position by integrating $v^n$ where n is an odd number representing an order of nonlinearity; $v=r^{mus}/(B_p*(|x_p|-x_{po}))$; $r^{mus}=K_r*(x^{mus}-x_p)$; $x^{mus}$ is the difference between the initial actuator position and a subsequently sensed actuator position; $K_r$ is a stiffness constant; $B_p$ is a damping coefficient; $x_{po}$ is a nonzero constant and $x_p$ is the calculated position having an initialization value of zero.

12. A compliant controller as recited in claim 5 wherein the force determining algorithm is a function of a stiffness constant to provide position control.

13. A compliant controller as recited in claim 5 wherein said processor includes a teaching mode that uses the force determining algorithm to determine an actuating force that allows the actuator to be manually moved to follow a desired path, the processor storing as command actuator positions the actuator positions sensed as the actuator is manually moved so that in a control mode the processor can control the actuator to move along the path represented by the actuator positions stored in the teaching mode.

14. A method for determining an actuator force for a compliant controller that controls an actuator without requiring a force sensor comprising:

sensing the position of an actuator;

calculating an actuating force in accordance with a force determining algorithm that is a function of an initial actuator position, a subsequently sensed actuator position, a desired position and a position calculated from a nonlinear damping function;

determining a difference between an initial actuator position and a subsequently sensed actuator position; and resetting the calculated position to a predetermined value if the difference is less than the predetermined amount of movement to adapt the actuating force to a disturbing force.

15. A method for determining an actuator force as recited in claim 14 wherein said predetermined value to which said calculated position is reset is zero.

16. A method for determining an actuator force as recited in claim 14 wherein the calculated actuator force is nonzero in the presence of a disturbing force to cause the actuator to automatically move upon removal of the disturbing force.

17. A method for determining an actuator force as recited in claim 14 including the steps of:

determining whether the controller is in a teaching mode or a control mode; and storing in the teaching mode the sensed actuator positions as the actuator is manually moved to follow a desired path with the determined actuator force aiding in the movement of the actuator.

18. A method for determining an actuator force as recited in claim 14 including the step of setting the initial actuator position to the subsequently sensed actuator position if the difference is greater than the predetermined amount of movement.

19. A compliant controller as recited in claim 14 wherein said force determining algorithm simulates a primate muscle.

20. A compliant controller as recited in claim 14 wherein said processor calculates a position by integrating $v^n$ where n is an odd number representing an order of nonlinearity; $v=r^{mus}/(B_p*(|x_p|-x_{po}))$; $r^{mus}=K_r*(x^{mus}-x_p)$; $x^{mus}$ is the difference between the initial actuator position and a subsequently sensed actuator position; $K_r$ is a stiffness constant; $B_p$ is a damping coefficient; $x_{po}$ is a nonzero constant and $x_p$ is the calculated position having an initialization value of zero.

* * * * *